US012807080B2

(12) United States Patent
Kruse et al.

(10) Patent No.: US 12,807,080 B2
(45) Date of Patent: Nov. 24, 2026

(54) VEHICLE GARNISH ASSEMBLY WITH FRONT RETURN FLANGE

(71) Applicant: Honda Motor Co., Ltd., Tokyo (JP)

(72) Inventors: Patrick W Kruse, Marysville, OH (US); Jeffrey D. Wheeland, Radnor, OH (US); David J Rose, West Mansfield, OH (US); Hirofumi Takemoto, Dublin, OH (US); Liza G Bare, Powell, OH (US); Austin Kimbrell, Powell, OH (US); Nigel Williams, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 18/415,218

(22) Filed: Jan. 17, 2024

(65) Prior Publication Data

US 2025/0229732 A1 Jul. 17, 2025

(51) Int. Cl.
*B60R 13/04* (2006.01)
*B62D 25/04* (2006.01)

(52) U.S. Cl.
CPC .............. *B60R 13/04* (2013.01); *B62D 25/04* (2013.01)

(58) Field of Classification Search
CPC ...... B60R 13/04; B62D 25/04; B62D 35/005; B62D 35/007; B62D 35/008
USPC .................. 296/193.06, 187.01, 180.1, 1.08
See application file for complete search history.

(56) References Cited

U.S. PATENT DOCUMENTS 4,950,019 A * 8/1990 Gross .................... B60J 10/265 296/93
7,661,703 B2 2/2010 Ono et al.
8,579,355 B2 * 11/2013 Ogawa ...................... B60J 1/10 296/146.15
9,033,395 B2 5/2015 Gerhardt et al.
2022/0176895 A1 * 6/2022 Gao ........................ B60R 13/04
2023/0356577 A1 * 11/2023 Hick ...................... B60J 10/265
2025/0229731 A1 * 7/2025 Kruse ..................... B60R 13/07

FOREIGN PATENT DOCUMENTS

| | | | |
|---|---|---|---|
| JP | 2007055317 | A | 3/2007 |
| JP | 2008260486 | A | 10/2008 |
| JP | 4264797 | B2 | 5/2009 |
| JP | 4588402 | B2 | 12/2010 |
| JP | 4610704 | B2 | 1/2011 |
| JP | 4751856 | B2 | 8/2011 |

(Continued)

OTHER PUBLICATIONS

CN115416454A with English translation; Jiang et al.; Dec. 2, 2022 (Year: 2026).*

*Primary Examiner* — Roger L Pang

(74) *Attorney, Agent, or Firm* — Plumsea Law Group, LLC

(57) ABSTRACT

A garnish assembly for a vehicle, the vehicle including a rear end, a rear quarter panel window, and a side panel, and the vehicle defining an inner passenger compartment. The garnish assembly includes a garnish panel configured to be mounted on the vehicle between the rear end and the rear quarter panel window. The garnish panel includes an elongate main body and a front return flange extending from a forward portion of the elongate main body. The front return flange is configured to be disposed between an outer surface of the side panel and an inner surface of the rear quarter panel window when the garnish panel is mounted on the vehicle.

15 Claims, 5 Drawing Sheets

(56) References Cited

FOREIGN PATENT DOCUMENTS

| | | | |
|---|---|---|---|
| JP | 2012126326 | A | 7/2012 |
| JP | 5498866 | B2 | 5/2014 |
| JP | 6304200 | B2 | 4/2018 |
| JP | 6995811 | B2 | 1/2022 |
| KR | 0147478 | B1 | 3/1997 |

* cited by examiner

VEHICLE GARNISH ASSEMBLY WITH FRONT RETURN FLANGE

BACKGROUND

1. Field of the Disclosure

The present disclosure relates to a vehicle garnish assembly and, more particularly, to a garnish panel having a front return flange forming a proud condition relative to an adjacent glass panel.

2. Description of Related Art

Many automobiles and other motorized vehicles include panels that enhance the appearance and/or functionality of the vehicle body. These panels are referred to as garnish panels or simply a "garnish." Garnish panels are often placed at the edges of body panels, for example adjacent glass windows. High-speed air flowing over a small gap between the glass window and the garnish may cause air from the open cavity behind the garnish to vent through the small gap due to a negative pressure differential created between the stagnant air behind the garnish and the high-speed air on the outside of the garnish. This venting effect may create a wind noise that can cause a disturbance to passengers within the cabin.

There is a need in the art for an improved garnish assembly to minimize any wind noise and thus reduce the passenger disturbance.

SUMMARY

The disclosure herein is directed to a vehicle garnish assembly with a return flange configured to reduce wind noise. The disclosed garnish panel achieves this reduction of the wind noise due to a combination of 1) a front return flange that impedes the air within the open cavity behind the garnish from venting through the small gap and 2) the garnish panel presenting a proud condition adjacent the glass window so as to slow the high-speed air as it flows over the small gap. These features in combination greatly reduce the speed of air exiting from behind the garnish panel to thereby eliminate or significantly reduce wind noise produced during vehicle travel.

In one aspect, the disclosure provides a garnish panel for a vehicle including a main body having a front edge and an opposing rear edge, and a return flange extending from the front edge of the main body. The return flange includes a first portion and a second portion, the first portion extending at an angle from the front edge of the main body and the second portion extending forward from the first portion such that the second portion is substantially parallel with the main body.

In another aspect, the disclosure is directed to a garnish assembly for a vehicle, the vehicle including a rear end, a rear quarter panel window, and a side panel, and the vehicle defining an inner passenger compartment. The garnish assembly includes a garnish panel configured to be mounted on the vehicle between the rear end and the rear quarter panel window. The garnish panel includes an elongate main body and a front return flange extending from a forward portion of the elongate main body. The front return flange is configured to be disposed between an outer surface of the side panel and an inner surface of the rear quarter panel window when the garnish panel is mounted on the vehicle.

A further aspect of the disclosure is directed to a vehicle, the vehicle having a vehicle body including a rear end and a rear quarter panel window, and the vehicle defining an inner passenger compartment. The vehicle also includes a D-pillar garnish configured to be mounted on the vehicle body between the rear end and the rear quarter panel window. The D-pillar garnish includes an elongate main body and a front return flange extending from a forward portion of the main body when the D-pillar garnish is mounted on the vehicle. A gap is defined between a rear edge of the rear quarter panel window and a front edge of the elongate main body, and the front return flange is disposed between an outer surface of a vehicle body side panel and an inner surface of the rear quarter panel window such that the front return flange overlaps the gap and the rear edge of the rear quarter panel window.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The disclosure herein is directed to a vehicle including a vehicle body defining a structural periphery of the vehicle. As shown in the accompanying figures and discussed in greater detail below, the vehicle includes a garnish panel configured to be mounted on the vehicle body. The garnish panel may be configured to be mounted on any suitable portion of the vehicle body. In some exemplary embodiments, the garnish arrangement is configured to be mounted in a D-pillar region of the vehicle body. The D-pillar region of a vehicle is a known region of a vehicle body defining the rear most vertical roof support structure or "pillar" that generally extends between a rear quarter panel window and a tailgate of a four-door vehicle with a rear hatch. Examples of such vehicles may include sport utility vehicles (SUV's), wagons, cross-overs, and other vehicles of similar constructions.

Figure 1:
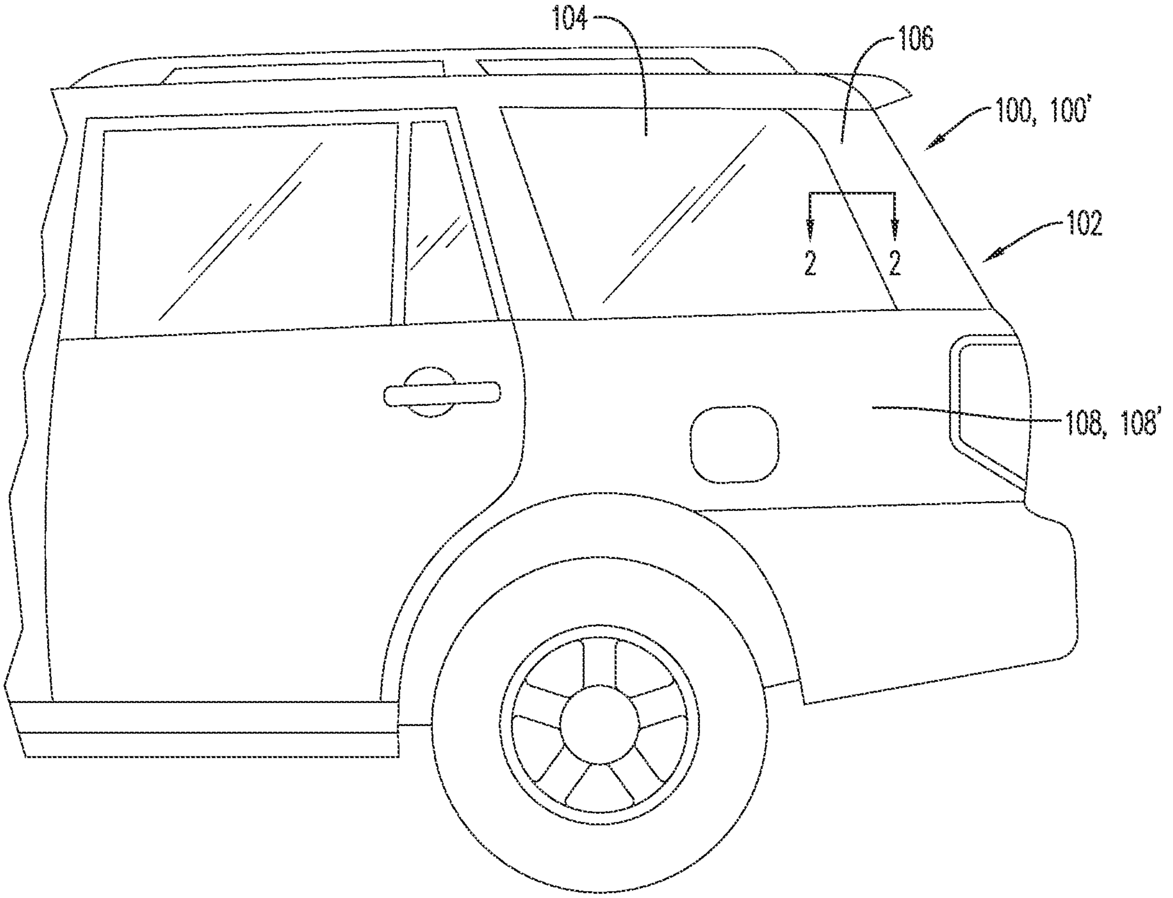
FIG. 1 is a schematic side view of a portion of a vehicle generally illustrating a D-pillar garnish and adjacent vehicle panels.

Referring to FIG. 1, a vehicle including a D-pillar garnish is shown generally by reference numeral 100. Vehicle 100 includes a rear end 102, an opposing forward end (not shown), a rear quarter panel window 104, and a garnish panel 106 located proximate the rear quarter panel window 104 and a rear hatch (not shown) of vehicle 100.

Figure 2A:
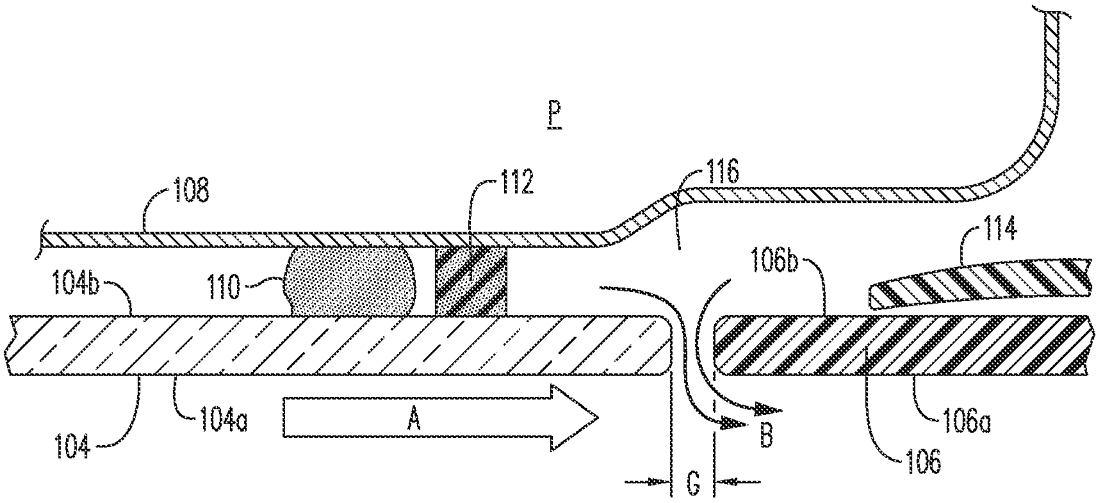
FIG. 2A (PRIOR ART)
FIG. 2A is a schematic cross section taken generally along line 2-2 in FIG. 1 of a D-pillar garnish arrangement and an adjacent glass panel, according to the prior art.
Figure 2B:
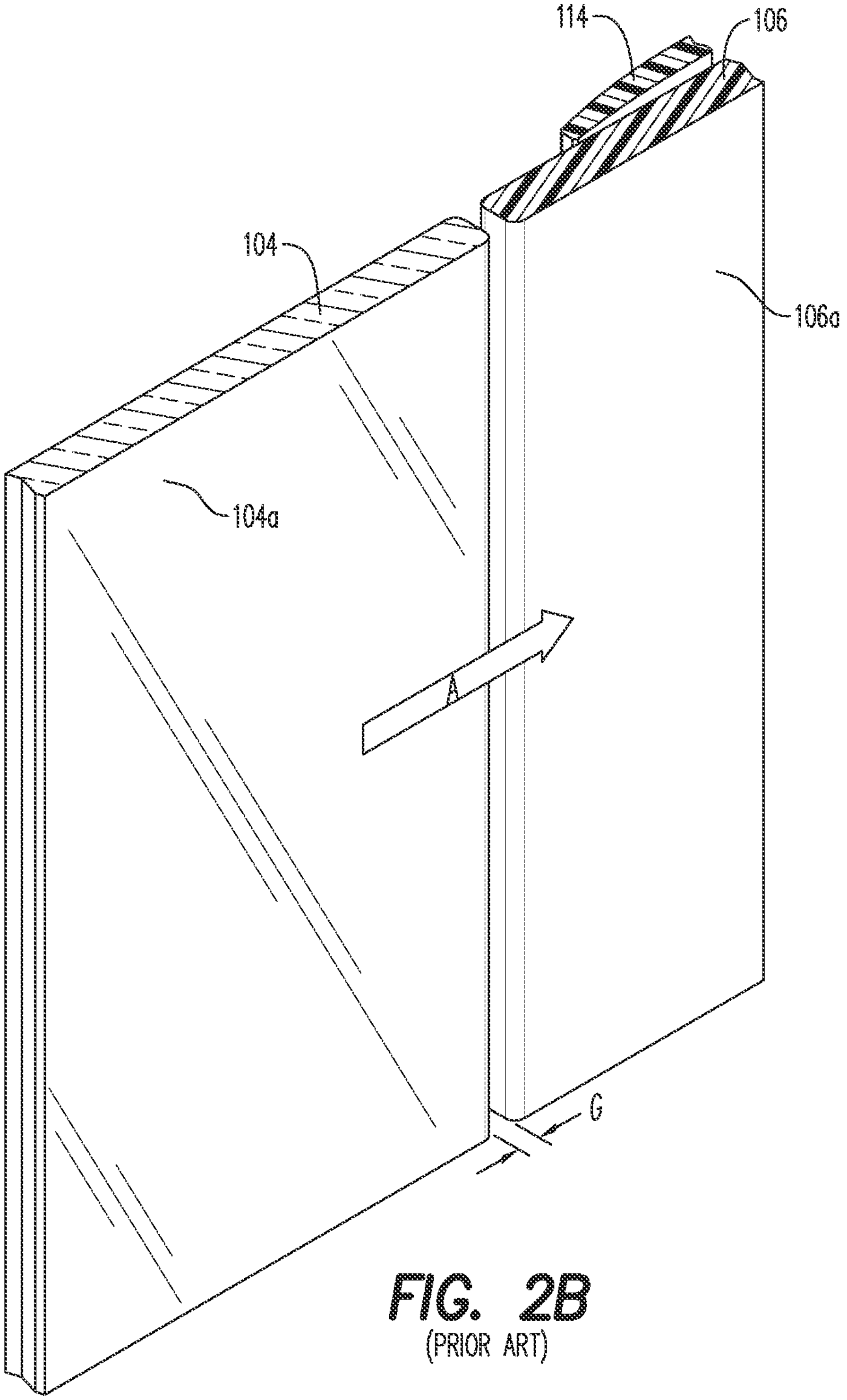
FIG. 2B (PRIOR ART)
FIG. 2B is a perspective view of the prior art D-pillar garnish arrangement shown in FIG. 2A.

As illustrated in the cross section of FIG. 2A, a side panel 108 of the vehicle 100 is disposed inward (towards the passenger compartment P) relative to the rear quarter panel window 104. The garnish panel 106 is disposed rearward of the rear quarter window panel 104 and, as known in the art, a small gap G is defined therebetween. The gap is generally on the order of 0.5 to 8 mm in width. On the exterior of the vehicle 100, an outer surface 104*a* of the rear quarter panel window 104 is generally flush with an outer surface 106*a* of the garnish panel 106, as shown best in FIG. 2B. An open cavity or void 116 is defined between an inner surface 104*b* of the rear quarter panel window 104 and the side panel 108. A seal 110 may be disposed between the rear quarter panel window 104 and the side panel 108. The seal 110 may be an urethane adhesive or any similar material suitable for attaching the glass material of the window 104 to the side panel 108, which is generally formed from metal. A dam 112 may also be disposed between the rear quarter panel window 104 and the side panel 108 in order to set the spacing of the window 104 relative to the panel 108. The dam 112 is formed from, by way of example, rubber (natural or synthetic), foam rubber, compressible polymers, and the like. Between the inner surface 106*b* of the garnish panel 106 and the side panel 108, a further inner garnish panel 114 may be provided.

As illustrated in FIG. 2A, when the vehicle 100 is in forward motion, the wind or air will be travelling over the vehicle 100 in the direction of airflow arrow A. High-speed air flowing over the gap G between the window 104 and the garnish panel 106 creates a negative pressure differential between the stagnant air behind the garnish panel 106 and the high-speed air flowing on the outside of the garnish 106 in the direction of arrow A. This causes air from within the open cavity 116 behind the garnish panel 106 to vent through the gap G, as shown by airflow arrow B. This outward flow of air may result in a whistling sound that is unpleasant for occupants of the vehicle.

Figure 3A:
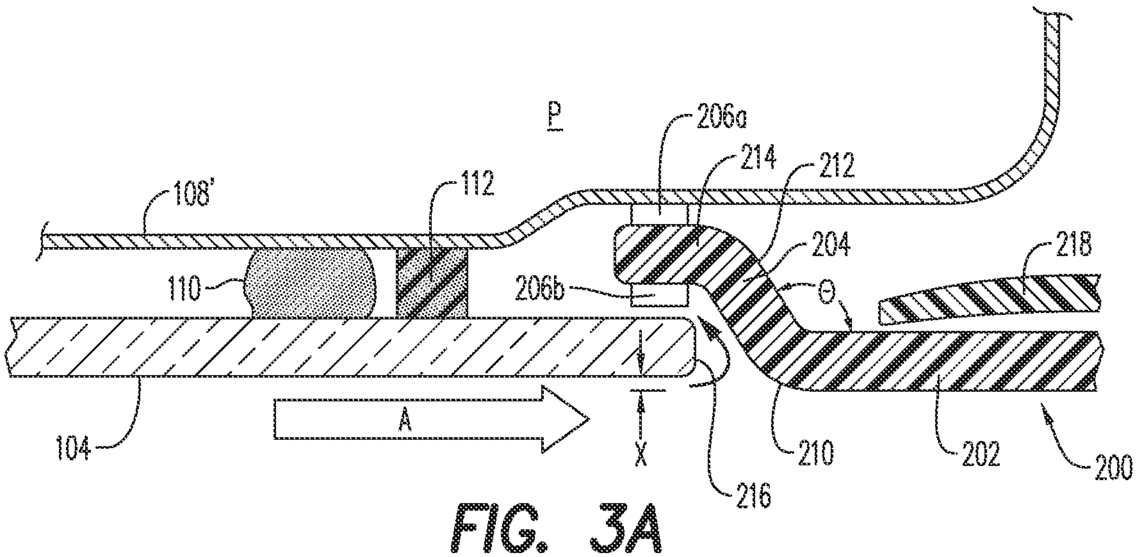
FIG. 3A is a schematic cross-section taken generally along line 2-2 in FIG. 1 of a garnish assembly and an adjacent glass panel according to an exemplary embodiment of the disclosure.
Figure 4:
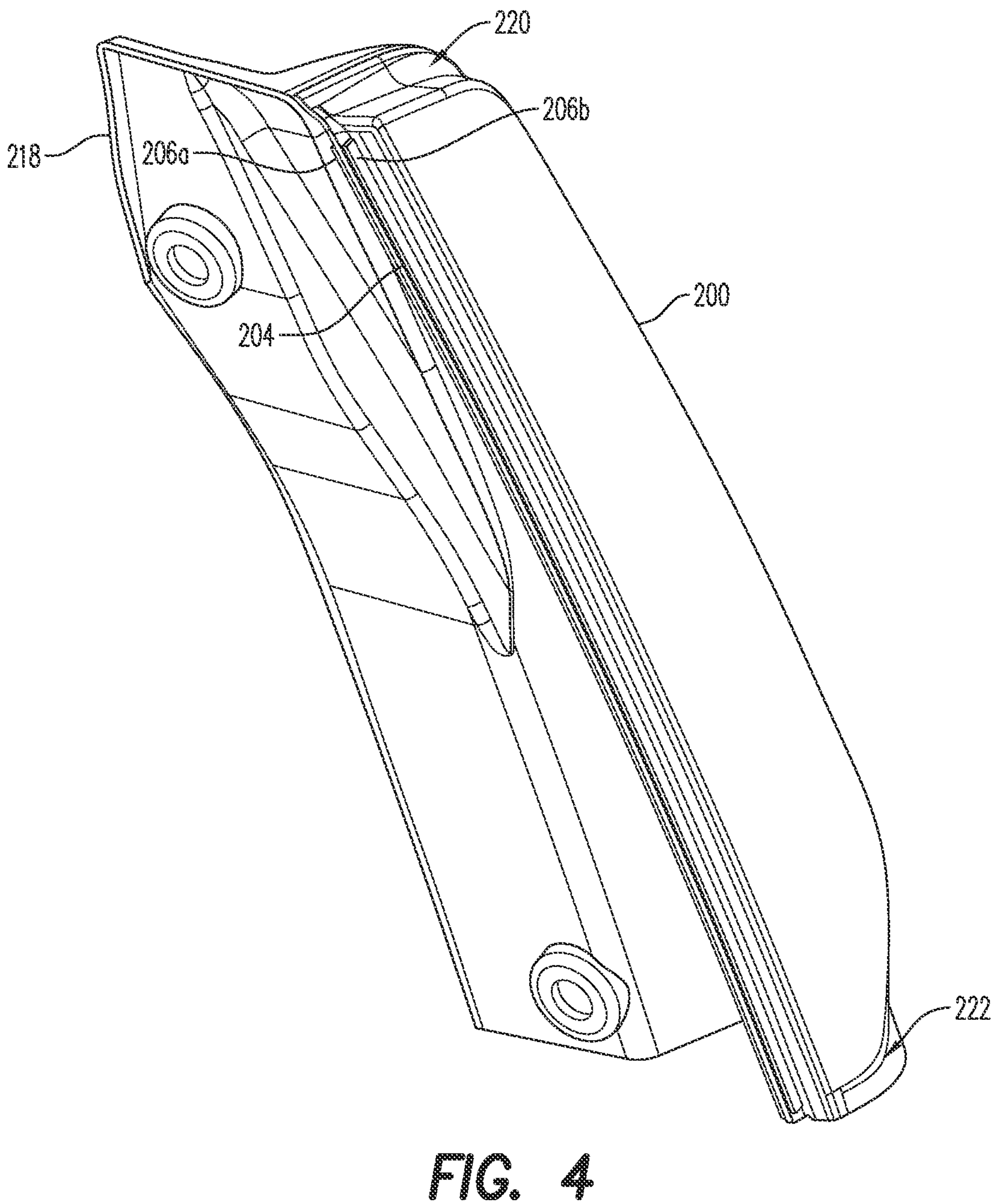
FIG. 4 is a perspective view of a garnish assembly according to an exemplary embodiment of the disclosure.

To address this concern caused by the rapid outflow of air through the gap G, an exemplary embodiment of the disclosure herein provides a D-pillar garnish or garnish panel with a return flange, as shown generally in FIG. 3A by reference numeral 200. Garnish panel 200 includes a main body 202 and a forward return flange 204 extending from a forward portion of the main body 202. Referring also to FIGS. 1 and 4, garnish panel 200 defines an elongate member extending from an upper edge 220 proximate the roof panel of the vehicle 100' to a lower edge 222 generally corresponding in height to the lower edge of the rear quarter panel window 104. The garnish panel 200, including the main body 202 and the flange 204, can be molded from a plastic material, such as ABS or AEPDS or ASA, and the like, however one skilled in the art will understand that other materials and production methods could of course be used. A compressible gasket 206*a*, 206*b*, such as a foam strip or urethane tape such as Poron®, for example, is added to each edge of the return flange 204 to prevent the return flange 204 from scratching the glass of the window 104 or rubbing the metal side panel 108', respectively. The addition of the gasket 206*a*, 206*b* also assists in preventing any rattling or squeaking noises. An inner garnish panel 218 may also be disposed between the garnish panel 200 and the side panel 108'.

Figure 3B:
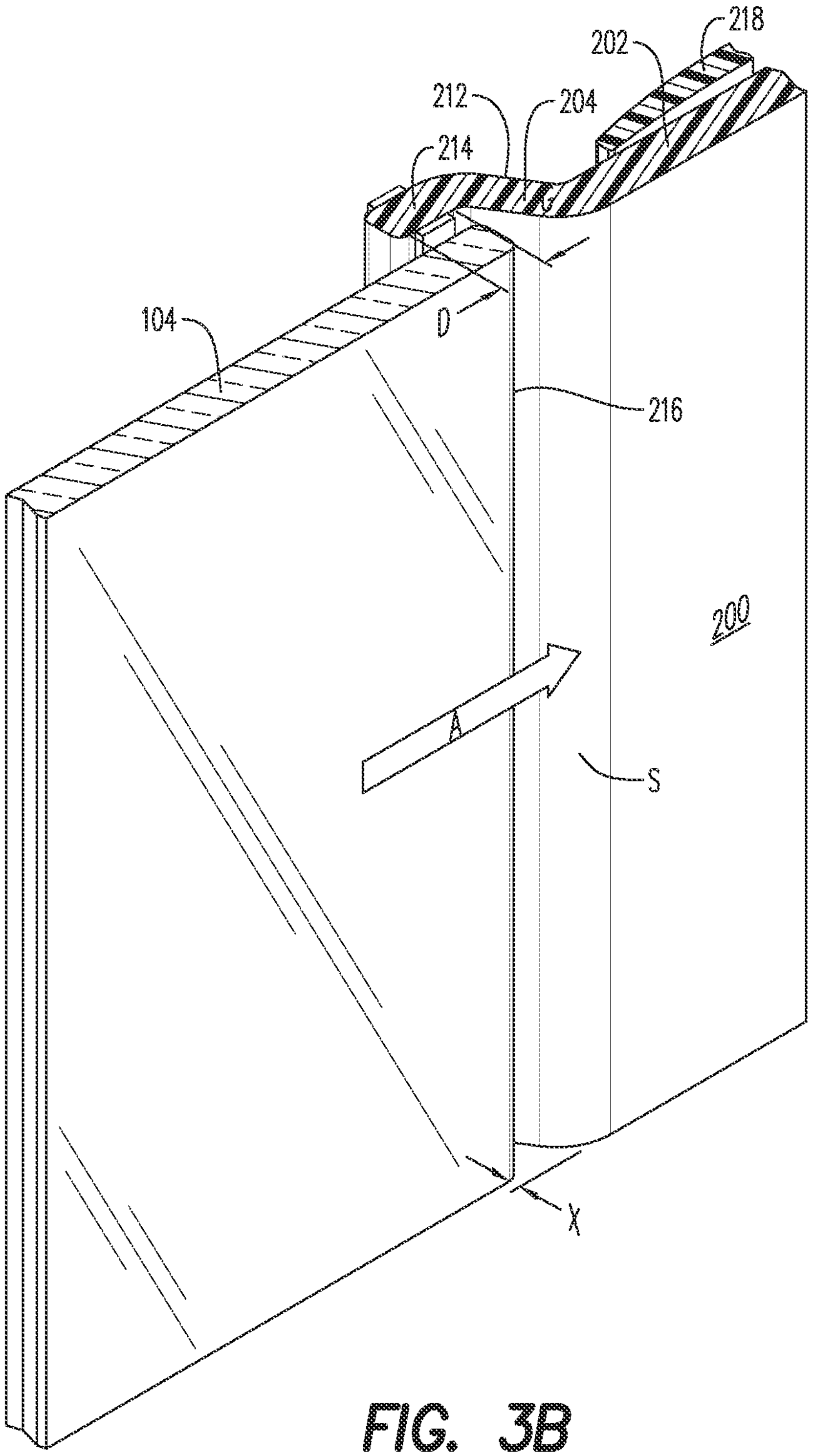
FIG. 3B is a perspective view of the garnish assembly shown in FIG. 3A.

As illustrated best in FIG. 3B, the garnish 200 is mounted in a proud condition relative to the adjacent window 104. That is, the garnish 200 is offset outward from the window 104 by a distance “x” having a dimension of approximately 1.0-3.0 mm, and more particularly approximately 2.0 mm. The high-speed air flow A is thus slowed down when it encounters the offset step S and creates positive pressure, thereby reducing the pressure differential and venting effect to improve wind noise performance for the passengers within the cabin of the vehicle. The outward height of the step S of the garnish 200 may vary depending upon the design of the vehicle and should not be limited to the exemplary range given above as long as a proud condition is maintained.

The return flange 204 extends from the forward edge 210 of the garnish panel 200. A first portion 212 of the flange 204 extends at an angle θ of approximately 95 to 145 degrees inwardly toward the passenger compartment P of the vehicle, and a second portion 214 extends forward from the first portion 212. The second portion 214 is generally parallel with the main body 202 of the panel 200 and overlaps with a rear edge 216 of the window 104. In the exemplary embodiment herein, the second portion 214 extends past the rear edge 216 of window 104 by a distance D of approximately 3 to 10 mm, but the overlap may of course be greater or less depending upon the design characteristics of the vehicle. Similarly, the angle θ of the first portion 212 may vary depending upon the design of the vehicle and should not be limited to the exemplary range given above.

In the exemplary embodiment herein, air within the open cavity 116 between the side panel 108 of the vehicle and the inner surface of garnish panel 200 does not readily escape through the gap G as in the prior art. Instead, the front return flange 204 substantially closes off the passageway to the gap G. The air may still flow from the open cavity 116 behind garnish panel 200 through the gap G toward the exterior of the vehicle. However, because of the overlap between the return flange 204 and the window 104, the air escapes at slower speeds, thereby reducing or eliminating the whistling sound that is unpleasant for occupants of the vehicle.

Thus, as explained in detail above, garnish panel 200 utilizes a combination of the proud application of the garnish 200 relative to the rear quarter panel window glass and a front return flange 204 overlapping behind the rear quarter window glass in order to provide an improved garnish system that minimizes wind noise and thus reduces the disturbance to passengers within the vehicle. One skilled in the art will recognize, however, that these features could of course be used independently from one another to also achieve a reduction of the wind noise to some extent.

While various embodiments of the disclosure have been described, the description is intended to be exemplary, rather than limiting and it will be apparent to those of ordinary skill in the art that many more embodiments and implementations are possible that are within the scope of the disclosure. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the disclosure is not to be restricted except in light of the attached claims and their equivalents. Also, various modifications and changes may be made within the scope of the attached claims.

We claim:

1. A vehicle comprising:
a vehicle body including a rear end and a rear quarter panel window, the vehicle defining an inner passenger compartment;
a D-pillar garnish configured to be mounted on the vehicle body between the rear end and the rear quarter panel window, the D-pillar garnish including:
an elongate main body; and
a front return flange extending from a forward portion of the main body when the D-pillar garnish is mounted on the vehicle;
wherein a gap is defined between a rear edge of the rear quarter panel window and a front edge of the elongate main body; and
wherein the front return flange is disposed between an outer surface of a vehicle body side panel and an inner surface of the rear quarter panel window such that the front return flange overlaps the gap and the rear edge of the rear quarter panel window.

2. The vehicle according to claim 1, wherein the rear quarter panel window defines an outer window surface and the elongate main body of the D-pillar garnish defines an outer vehicle surface, wherein the outer vehicle surface is offset outwardly from the outer window surface, relative to the inner passenger compartment, such that a step is created between the rear quarter panel window and the D-pillar garnish in a longitudinal direction of the vehicle.

3. The vehicle according to claim 2, wherein the step created by the offset between the rear quarter panel window and the D-pillar garnish defines a proud condition of approximately 1.0-3.0 mm.

4. The vehicle according to claim 1, wherein the front return flange includes an inner surface proximal the vehicle body side panel and an outer surface proximal the rear quarter panel window, the front return flange further comprising a first gasket disposed between the inner surface of the front return flange and the vehicle body side panel and a second gasket disposed between the outer surface of the front return flange and the rear quarter panel window.

5. The vehicle according to claim 1, wherein the return flange includes a first portion and a second portion, the first portion extending at an angle from the front edge of the elongate main body, and the second portion extending from the first portion, the second portion being substantially parallel with the elongate main body.

6. The vehicle according to claim 1, wherein front return flange overlaps the rear edge of the rear quarter panel by a distance of approximately 3-10 mm.

7. A garnish assembly for a vehicle, the vehicle including a rear end, a rear quarter panel window, and a side panel, and the vehicle defining an inner passenger compartment, the garnish assembly comprising:
a garnish panel configured to be mounted on the vehicle between the rear end and the rear quarter panel window, the garnish panel including:
an elongate main body; and
a front return flange extending from a forward portion of the elongate main body;
wherein the front return flange is configured to be disposed between an outer surface of the side panel and an inner surface of the rear quarter panel window when the garnish panel is mounted on the vehicle; and
wherein the front return flange includes a first portion and a second portion, the first portion extending at an angle from the forward portion of the elongate main body and the second portion extending forward from the first portion such that the second portion is substantially parallel with the elongate main body.

8. The garnish assembly according to claim 7, wherein the front return flange is configured to overlap a rear edge of the rear quarter panel window when the garnish panel is mounted on the vehicle.

9. The garnish assembly according to claim 8, wherein front return flange is configured to overlap the rear edge of the rear quarter panel by a distance of approximately 3-10 mm.

10. The garnish assembly according to claim 8, wherein the elongate main body of the garnish panel defines an outer vehicle surface when the garnish panel is mounted on the vehicle, the outer vehicle surface being offset outwardly from the rear quarter panel window, relative to the inner passenger compartment, such that a step is created between the rear quarter panel window and the garnish panel in a longitudinal direction of the vehicle.

11. The garnish assembly according to claim 10, wherein the step created by the offset between the rear quarter panel window and the garnish panel defines a proud condition of approximately 1.0-3.0 mm.

12. The garnish assembly according to claim 7, wherein the first portion extends from the forward portion of the main body by an angle of approximately 95 to 145 degrees.

13. The garnish assembly according to claim 10, wherein the front return flange includes a first gasket configured to be disposed between an inner surface of the front return flange and the side panel of the vehicle and a second gasket configured to be disposed between an outer surface of the front return flange and the rear quarter panel window.

14. The garnish assembly according to claim 13, wherein the first and second gaskets comprise a urethane tape.

15. The garnish assembly according to claim 9, further comprising an inner garnish panel configured to be disposed between the elongate main body and the side panel of the vehicle.

* * * * *